(12) United States Patent
Perrin et al.

(10) Patent No.: US 8,460,780 B2
(45) Date of Patent: *Jun. 11, 2013

(54) ARRANGEMENT FOR ATTACHING A SAFETY GLAZING ELEMENT

(75) Inventors: Vincent Perrin, Saint Martin de Brethencourt (FR); Eric Rouffignac, Saint-martin-de-nigelles (FR)

(73) Assignee: Renault S.A.S., Boulogne-Billancourt (FR)

( * ) Notice: Subject to any disclaimer, the term of this patent is extended or adjusted under 35 U.S.C. 154(b) by 495 days.

This patent is subject to a terminal disclaimer.

(21) Appl. No.: 12/667,789

(22) PCT Filed: Apr. 22, 2008

(86) PCT No.: PCT/FR2008/050722
§ 371 (c)(1),
(2), (4) Date: Apr. 12, 2010

(87) PCT Pub. No.: WO2009/007554
PCT Pub. Date: Jan. 15, 2009

(65) Prior Publication Data
US 2010/0215916 A1    Aug. 26, 2010

(30) Foreign Application Priority Data
Jul. 9, 2007   (FR) .................. 07 56362

(51) Int. Cl.
*B32B 23/02*   (2006.01)
*E06B 9/01*    (2006.01)
*B60J 1/10*    (2006.01)
*E06B 3/00*    (2006.01)

(52) U.S. Cl.
USPC ........ 428/192; 52/204.6; 52/208; 296/146.15

(58) Field of Classification Search
USPC ............. 428/192; 52/204.6, 208; 296/146.15; 156/108
See application file for complete search history.

(56) References Cited

U.S. PATENT DOCUMENTS 8,029,040 B2 * 10/2011 Perrin et al. .............. 296/146.15
2009/0056246 A1 * 3/2009 Prince et al. ............... 52/204.53
2009/0189411 A1 * 7/2009 Perrin et al. ............. 296/146.15

FOREIGN PATENT DOCUMENTS

WO    96 26336        8/1996
WO    2007 042716    4/2007

* cited by examiner

Primary Examiner — Mark Ruthkosky
Assistant Examiner — Laura C Dettinger
(74) Attorney, Agent, or Firm — Oblon, Spivak, McClelland, Maier & Neustadt, L.L.P.

(57) ABSTRACT

An arrangement for attaching a safety glazing element for a building, including a supporting element connected to the building, and a glazing element including a pane coated with a safety film adhering to an inner surface of the pane. The glazing element is attached by an adhesive strip to the support. A border on the periphery of the pane is free of film so that a peripheral limit of the film is situated at a distance from the edge of the pane, the distance separating the edge of the pane and the limit of the film being alternately variable.

9 Claims, 1 Drawing Sheet

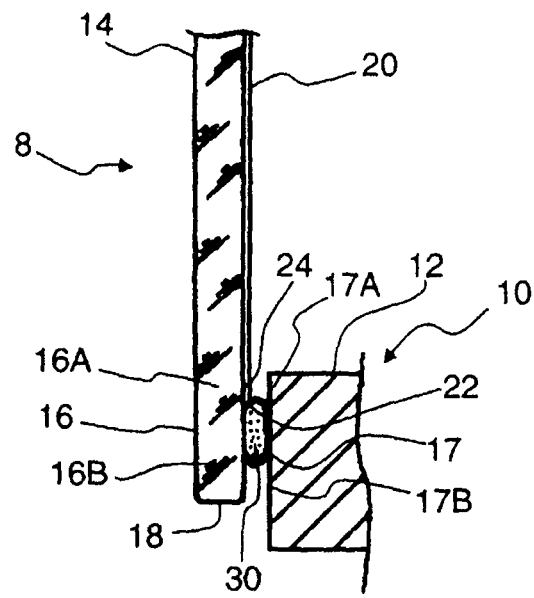
Figure 1
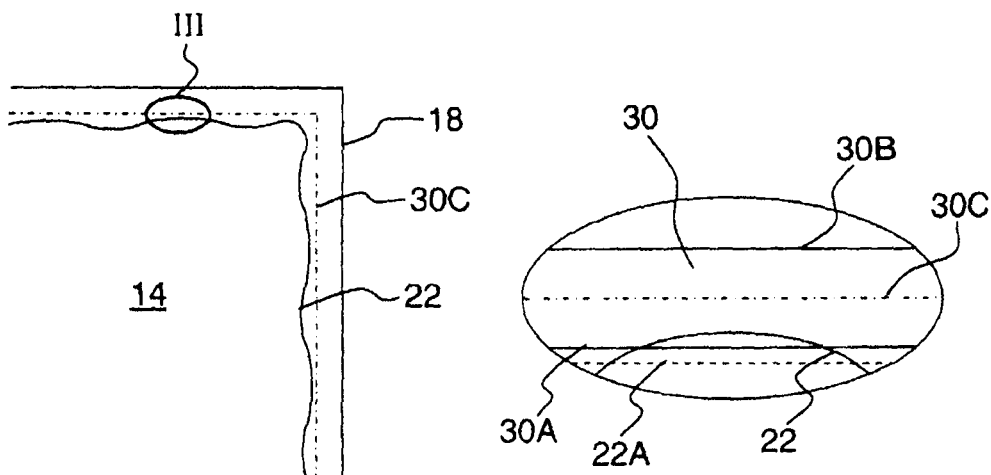
Figure 2
Figure 3

ARRANGEMENT FOR ATTACHING A SAFETY GLAZING ELEMENT

BACKGROUND

The present invention relates to a glazing element comprising a safety film. It relates in particular to an arrangement for attaching a building glazing element, for example a shop window or a glazed façade.

The document WO9626336 describes a building glazing element having a pane of glass of which one surface is entirely lined with a safety film. The safety film enables an anti-intrusion or non-break glazing element to be obtained. In that document, the glazing element is attached to the building by way of a mount element to which the surface of the glazing element which is lined with the film is adhesively bonded.

However, adhesively bonding the glazing element by way of the safety film impairs the quality of attachment of the glazing element because the glass pane is not adhesively bonded directly to the mount.

The document WO2007042716 provides a glazing element having a glass pane lined with a safety film, the glass pane having a peripheral region not lined with the film and thus enabling it to be attached directly to a mount element connected to the building without thereby impairing its hold.

However, the safety film is not held on the mount element and its effectiveness is reduced.

BRIEF SUMMARY

The aim of the invention is to provide a glazing element comprising a glass pane with a safety film for attaching the glass pane to a mount element of the building and also attaching the periphery of the film without the attachment of the film impairing the quality of attachment of the glass pane to the mount element.

To this end, the invention provides an arrangement for attaching a safety glazing element in which a border at the periphery of the glass pane is free of film such that a peripheral limit of the film is located at a distance from the edge of the glass pane, the distance between the edge of the glass pane and the limit of the film varying alternately.

According to other features of the invention, first peripheral portions of the film may be in contact with a strip of adhesive and second peripheral portions of the film may be free with respect to the strip of adhesive.

The first and second peripheral portions of the film may be alternately adjacent.

The limit of the film may be undulating, in particular in waves whose peaks correspond to the portions of the limit closest to the edge of the glass pane in the first portions, and whose troughs correspond to the portions of the limit furthest away from the edge of the glass pane in the second portions, the profile of each peak being flatter than the profile of each trough.

The distance between the limit of the film and the edge of the glass pane may vary alternately following a sine wave, a sawtooth profile or following a notched profile.

The greatest width of the film covered by the strip of adhesive in the first portions may be approximately 1 millimeter.

BRIEF DESCRIPTION OF THE DRAWINGS

The invention will now be described in examples with reference to the following drawings:

FIG. 1 is a schematic partial section view of a glazing element according to the invention fitted on a mount element, FIG. 2 is a partial plan view of a glazing element according to the invention, and FIG. 3 is a detail view of FIG. 2 as indicated by the reference III in FIG. 2.

DETAILED DESCRIPTION

A building may have openings which need to be covered with a glazing element, such as for example shop windows. These glazing elements are liable to be subject to acts of vandalism such as objects being thrown at them and are thus provided with a safety film which, without constituting a screen, slows down illegal entry, prevents the glass pane being dislocated from its mount, or prevents pieces of glass being thrown out under the effect of the impact.

According to the invention, a glazing element 8 comprises a glass pane 14 of which one surface is lined with a safety film 20. This safety film is a film of polyethylene terephthalate having a thickness of around 200 to 350 micrometers. This film 20 adheres to the glass pane 14 by way of an adhesive material.

This glazing element 8 is adhesively bonded to a mount element 10. This mount 10, for example a metal frame, is attached to the building and comprises a wall 12 which delimits an opening in this building.

The glazing element 8 fully or partially closes the opening. A peripheral portion 16 of the glass pane 14 covers the mount 10 over all or just part of the perimeter of the opening. Said portion 16 of the glass pane surrounds said opening such that it is opposite a region 17 of the mount extending at the periphery of the opening in a plane parallel to the glazing element 8.

The film 20 applied to the glass pane 14 is present over the entire inner surface of the glass pane 14 opposite the opening, but also around this surface, in order to limit deterioration of the glass pane close to its edges. The expression "inner surface of the glass pane 14" is understood to mean the surface opposite the mount 10.

In the example shown, a peripheral limit 22 of the film is located between the wall 12 of the mount defining the opening and the peripheral edge 18 of the glass pane such that a peripheral band 24 of the film extends between said peripheral portion 16 and said region 17. The band 24 is located opposite the region 17 on an inner fraction 17A of the region 17 next to the opening. The band 24 extends over an area of the glass pane covering an inner fraction 16A of the peripheral portion 16 next to the surface of the glass pane opposite the opening. The inner fractions 16A and 17A extend between the level of the limit 22 and the level of the wall 12 of the mount defining the opening.

An outer fraction 16B of the peripheral portion 16 is next to the peripheral edge 18 of the glass pane. The outer fraction 16B forms a free border of film, i.e. a border 16B of the glass pane not covered with the film. Apart from the border 16B located between the peripheral edge of the glass pane and the peripheral limit of the film, the glass pane is covered by the film over its entire inner surface.

The outer fraction 16B, or border 16B, and the outer fraction 17B thus extend between the level of the edge 18 and the level of the limit 22.

A strip of adhesive 30, also called an adhesive seal, is located between the region 17 and the portion 16 of the glass pane 14 for attaching the glazing element to the mount element 10.

The strip of adhesive 30 has an inner edge 30A by the film and an outer edge 30B by the peripheral edge 18 of the glass pane. The strip of adhesive 30 has a mid axis 30C.

The strip of adhesive 30 is also used to adhesively bond the film 20 in order to preserve the cohesion of the assembly formed by the glass pane and the film.

According to the invention, the peripheral limit 22 of the film is not rectilinear or approximately rectilinear.

In the exemplary embodiment shown, the limit 22 is undulating so as to form a mid line 22A (FIG. 3) approximately parallel to the edge of the glass pane along the greater part of the perimeter of the glass pane. The amplitude of the undulations is in this case around 5 millimeters.

In an embodiment which is not shown, the limit 22 is cut approximately following a sine wave having an amplitude of 4 millimeters. The amplitude of the sine wave depends on the width of the peripheral enameling of the glazing element, the enameling usually being intended to make the adhesive invisible from the outside.

In the embodiment shown, the limit 22 is cut following a profile forming waves. The peak of each wave, which corresponds to the portions of the limit 22 closest to the edge of the glass pane, has a flatter profile than the profile of the trough of each wave, which corresponds to the portions of the limit 22 furthest away from the edge of the glass pane.

According to the invention, the strip of adhesive 30 covers the wave peak and does not cover the wave trough. Each trough is thus free of adhesive bonding with respect to the strip 30. In the embodiment shown, the strip of adhesive 30 covers the peak of the waves for a distance of approximately 1 millimeter. In this case, the strip of adhesive 30 covers the peak of the waves for a distance of approximately one quarter of the wave amplitude and for a distance of less than one quarter of the width of the strip of adhesive.

The regions of the film not covered by the strip make it possible to avoid the presence of a region of incipient unsticking of the strip 30 from the glass pane, to the benefit of the quality of attachment of the glass pane 14 to the mount 10.

Thus, advantageously, if the adhesive material is insufficient for the cohesion of the film and the glass pane in the event of an impact on the glass pane, the strip of adhesive 30 prevents the glass pane being broken by reinforcing the effect of the film at its peripheral limit without harming the effect of the strip of adhesive for attaching the glass pane to the mount 10.

In a first phase of fitting the glazing element 8 to the mount 10 connected to the building, the strip of adhesive 30 is stuck on in a manner offset with respect to the mid line 22A of the peripheral limit 22 and then the safety glazing element is assembled on the mount.

It should be noted that the mid axis 30C of the strip of adhesive 30 is offset toward the outside, i.e. toward the peripheral edge 18 of the glass pane 14, both with respect to the mid line 22A and with respect to the peaks of the waves of the film.

The strip 30 is applied both over the outer fraction 16B of the peripheral portion 16 of the glass pane 14 and over the film 20, over the first peripheral portions of the film.

In a second fitting phase, the glass pane is then presented to the opening 12 and to the region 17 of the wall 10 and then the strip 30 is pressed against the outer fraction 17B in order to attach the glass pane 14 to the wall 10.

The strip 30, compressed between the glass pane 14 and the mount 10, adheres to a portion of the peripheral limit of the film.

Typically, the strip of adhesive 30 is around 6 to 10 millimeters wide.

In the embodiment shown, the non-rectilinear cut of the limit of the film is continuous, i.e. has no sharp corners, but as an alternative, the limit of the film follows a sawtooth profile, i.e. with triangular cuts which form peaks and troughs. As an alternative, the limit of the film follows a notched profile forming peaks and troughs.

In an alternative embodiment, all of the peaks do not connect with the adhesive, so that the second portions comprise a series of peaks and troughs.

The invention claimed is:

1. An arrangement for attaching a safety glazing element for a building to a mount, the glazing element comprising:
   a glass pane lined with a safety film adhering to an inner surface of the glass pane, the glazing element being attached by an adhesive strip to a mount element connected to the building, wherein
   a border at a periphery of an inner surface of the glass pane is free of film such that a peripheral limit of the film is located at a distance from an edge of the glass pane, and
   a distance between an edge of the glass pane and the peripheral limit of the film varies alternately such that both the glass pane and the safety film are attached by the adhesive strip to the mount element.

2. The arrangement for attaching the glazing element as claimed in claim 1, wherein
   first peripheral limit portions of the film are in contact with the strip of adhesive, and
   second peripheral limit portions of the film are free with respect to the strip of adhesive.

3. The arrangement for attaching the glazing element as claimed in claim 2, wherein the first and second peripheral limit portions of the film are alternately adjacent.

4. The arrangement for attaching the glazing element as claimed in claim 1, wherein the peripheral limit of the film is undulating.

5. The arrangement for attaching the glazing element as claimed in claim 2, wherein the peripheral limit of the film is undulating in waves whose peaks correspond to portions of the peripheral limit closest to the edge of the glass pane in the first peripheral limit portions, and whose troughs correspond to portions of the peripheral limit furthest away from the edge of the glass pane in the second peripheral limit portions, the profile of each peak being flatter than the profile of each trough.

6. The arrangement for attaching the glazing element as claimed in claim 1, wherein the distance between the peripheral limit of the film and the edge of the glass pane varies alternately following a sine wave.

7. The arrangement for attaching the glazing element as claimed in claim 1, wherein the peripheral limit of the film varies alternately following a sawtooth profile or following a notched profile.

8. The arrangement for attaching the glazing element as claimed in claim 2, wherein a greatest width of the film covered by the strip of adhesive in the first peripheral limit portions is approximately 1 millimeter.

9. The arrangement for attaching the glazing element as claimed in claim 2, wherein the strip of adhesive is in contact with the glass pane.

* * * * *